United States Patent [19]

DeSautel

[11] 4,214,720
[45] Jul. 29, 1980

[54] FLYING DISC

[76] Inventor: Edwin R. DeSautel, P.O. Box 1052, Richland, Wash. 99352

[21] Appl. No.: 15,410

[22] Filed: Feb. 26, 1979

[51] Int. Cl.³ .................... B64C 27/20; B64C 29/00
[52] U.S. Cl. ................................. 244/12.2; 244/12.3;
   244/12.5; 244/23 C; 244/56
[58] Field of Search ............ 244/12.2, 12.3, 12.4,
   244/12.5, 23 C, 23 B, 23 D, 12.1, 56

[56] References Cited

U.S. PATENT DOCUMENTS

| | | | |
|---|---|---|---|
| 3,514,053 | 5/1970 | McGuinness | 244/12.2 |
| 3,612,445 | 10/1971 | Phillips | 244/12.2 |
| 3,785,592 | 1/1974 | Kerruish | 244/12.2 |

FOREIGN PATENT DOCUMENTS

| | | | |
|---|---|---|---|
| 1406394 | 4/1969 | Fed. Rep. of Germany | 244/23 C |
| 586605 | 12/1958 | Italy | 244/12.2 |

*Primary Examiner*—Charles E. Frankfort
*Attorney, Agent, or Firm*—Wells, St. John & Roberts

[57] ABSTRACT

A flying disc capable of vertical takeoff, hovering, or powered horizontal flight. The disc includes a discoidal wing that is circular and includes a convex surface on an upper side and a concave lower surface. The wing also includes an inward leading edge that defines a circular opening centered on an upright central axis. The arcuate surfaces converge at the leading edge and at an outer concentric trailing edge. The discoidal wing is freely rotatable on a central support structure that also supports a cockpit. Two sets of turbine blades are affixed to the discoidal wing adjacent the leading edge. Thrust producing engines are mounted to the central support structure to direct thrust radially outward through the turbine blades. This results in rotation of the discoidal wing and produces lift. The angle of thrust may be adjusted such that the thrust is directed only across one or the other set of turbine blades or any selected variation between extreme positions to change the lift characteristics. A set of compressor blades is provided about an upper surface of the disc adjacent the cockpit. The compressor blades rotate with the discoidal wing to receive and direct air downwardly into the central support structure. They supply combustion air for the engine and reduce the air pressure above the disc. Horizontal thrust engines are supplied below the concave wing surface to provide horizontal thrust. Steering and rotational stabilization of the cockpit and central support structure is provided by a thrust diverting mechanism.

24 Claims, 8 Drawing Figures

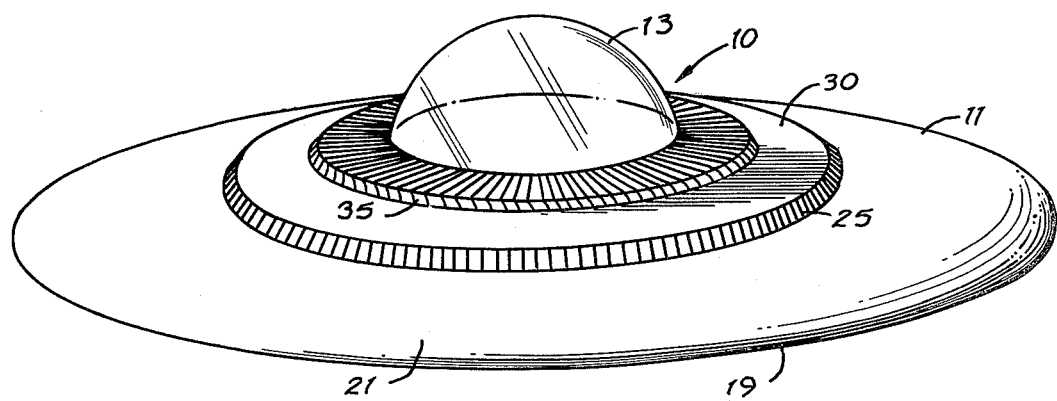
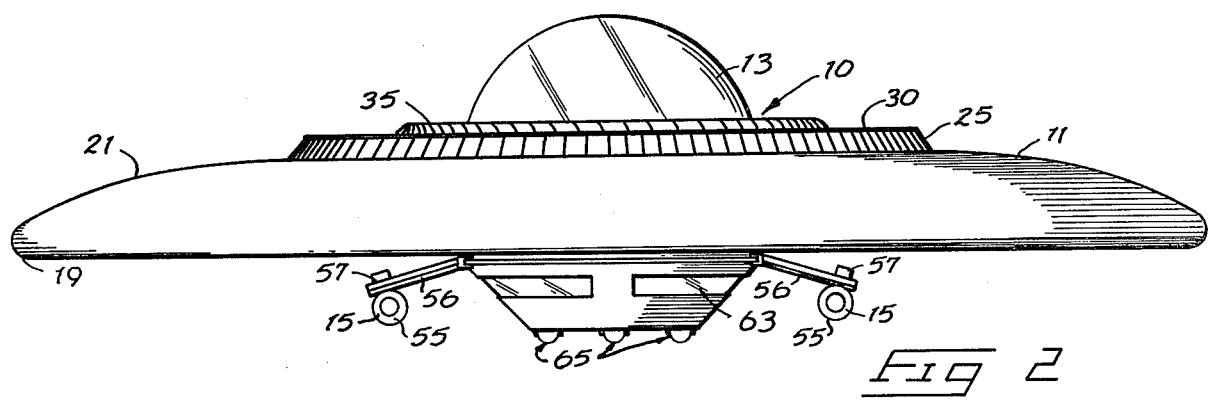
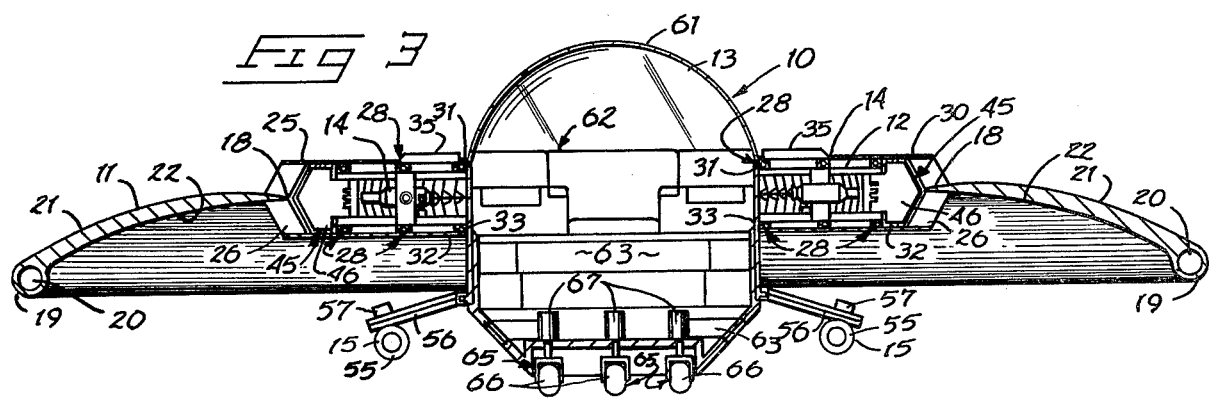

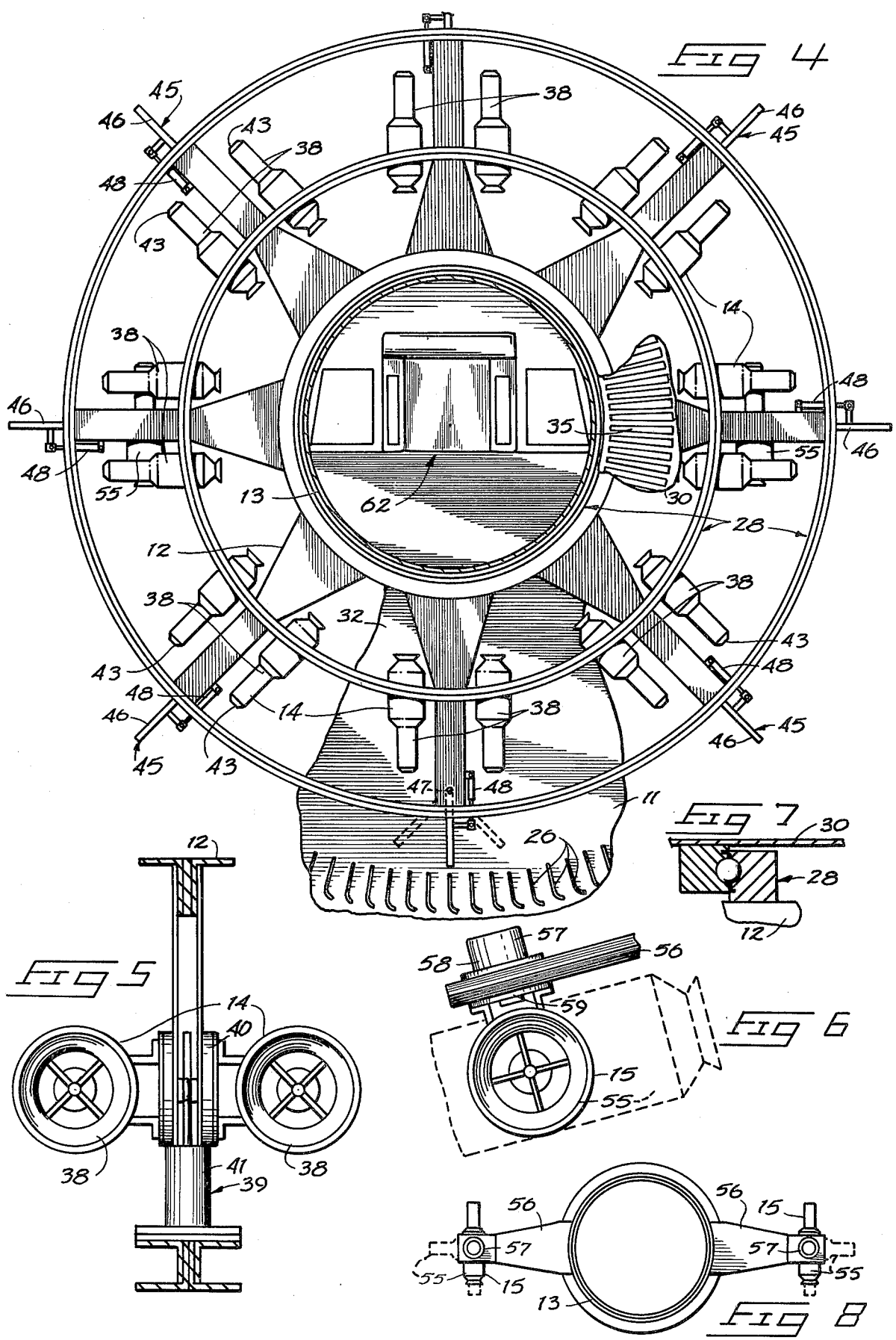

FLYING DISC

BACKGROUND OF THE INVENTION

The present invention is related to discoidal shaped aircraft.

The aerodynamic advantages of saucer shaped craft have been sought after in commerical, private and military aircraft design. A balanced spinning disc is capable of sustained flight as evidenced by the toy "frisbees" of current popularity. Discoidal flight is known and particular reference is made to it in U.S. Pat. No. 3,359,678.

This flight principle is claimed to be put to use in an invention disclosed in U.S. Pat. No. 3,946,970 in combination with vertical thrust means. The disclosure relates to a "gyroscopically stabilized vertical takeoff and landing aircraft". The craft includes an outer spinning ring that does not, of itself, produce vertical lift during takeoff or hovering of the craft. Instead, lift is provided by downwardly directed thrust produced by conventional jet or rocket engines. Part of the engine thrust is diverted through a complex ducting arrangement to produce rotation of the ring. Thus, the craft has the advantage of the spinning disk principle during horizontal flight but necessarily relies solely upon the downward thrust of its engines to accomplish vertical takeoff or for hovering.

U.S. Pat. No. 2,801,058 to C. P. Lent issued July 30, 1957 discloses a saucer shaped aircraft. Lent discloses the principle of forming a disc from a standard aircraft wing shaped configuration and producing thrust in radial directions about a central axis over the annular surfaces of the discoidal wing. The inventor claims that sufficient lift is provided by directing radial thrust across an annular ring to provide vertical takeoff and hovering capability. The nature of the craft, however, does not permit simultaneous rotation of the annular wing for a spinning disc effect, nor is additional thrust provided for lift during vertical takeoff or hovering situations.

Applicant has conceived of the unique combination of air foil configuration and the spinning disc principle that represents a substantial improvement over known forms of discoidal aircraft. Lift is produced both by the discoidal spinning wing moving through ambient air and by thrust from internal engines which is directed over the discoidal wing surface configurations and which also produces the wing rotation.

BRIEF DESCRIPTION OF THE DRAWINGS

FIG. 1 is a pictorial view of the present flying disc;

FIG. 2 is a slightly enlarged side elevation view;

FIG. 3 is a cross-sectional view of the present disc structure;

FIG. 4 is a plan fragmentary detail view illustrating the central support structure and thrust means along with associated elements;

FIG. 5 is an enlarged frontal view of a pair of thrust producing engines and mechanisms by which they are mounted to the central support structure;

FIG. 6 is a fragmentary view of a horizontal directional thrust producing engine and its associated mount;

FIG. 7 is an enlarged section view of a ring bearing situated between the discoidal wing and central support structure; and FIG. 8 is a reduced diagrammatic plan view illustrating the pivotal mounting for the horizontal directional thrust producing engines.

DETAILED DESCRIPTION OF A PREFERRED EMBODIMENT

A flying disc embodying a preferred form of a present invention is illustrated in the accompanying drawings and is generally designated therein by the reference character 10. The flying disc 10 basically includes a discoidal wing 11 that is freely rotatably carried on a central support structure 12. A cockpit 13 is mounted to the central support structure 12 and is centered on an upright axis of rotation for the discoidal wing 11. Lift is produced through a thrust means 14 situated within the central support structure 12. Horizontal directional movement is achieved through a horizontal directional thrust means generally indicated at 15.

The discoidal wing 11 is illustrated in some detail in FIG. 3. As shown, the discoidal wing is annular and includes an inner circular leading edge 18 and an outward concentric trailing edge 19. An annular flotation ring 20 may be provided at the concentric upper trailing edge 19. Joining the leading edge 18 and trailing edge 19 is a convex upper wing surface 21 and a concave lower surface 22. These surfaces are joined by the edges 18 and 19 and, together, form the present wing cross-sectional geometry. The trailing edge 19 is situated elevationally below the leading edge 18 so as to produce a smooth curved upper surface across the entire disc body. Thus the entire disc of itself is formed in an airfoil configuration.

A first circular set of turbine blades 25 is mounted to the discoidal wing 11. These turbine blades 25 are centered on the upright rotational axis of the disc and extend upwardly from the leading edge 18 above the convex upper surface 21.

A second circular set of turbine blades 26 is provided. They are centered on the upright axis and are fixed to and extend downwardly from the lower concave surface 22 at the leading edge 18.

As seen in FIG. 3, the two sets of turbine blades 25 and 26 are in substantial axial alignment. Each blade of either set is formed to receive and direct thrust from the thrust producing means 14 outwardly across the surfaces of the discoidal wing. They are also designed to produce rotation of the discoidal wing in response to thrust from the means 14. Both sets are designed to produce rotation of the discoidal wing in a single direction.

The discoidal wing is rotatably mounted to the central support structure through a bearing means that is generally shown at 28 (FIGS. 3, 4 and 7). Specifically, an upper relatively horizontal cover surface 30 extends from upper ends of the first set of turbine blades 25 inwardly to a ring bearing 31 adjacent cockpit 13 on support structure 12. A similar bottom cover surface 32 (FIG. 3) extends from bottom ends of the second set of turbine blades 26 to a second axially spaced ring bearing 33 that is also situated adjacent to the cockpit on the central support structure 12. Additional sets of ring bearings may be provided as shown between the discoidal wing and central support structure to insure precise rotation of the discoidal wing about the central upright axis. Such bearings may also dissipate stresses that will occur between the discoidal wing and central support structure.

A typical cross section of the bearing means 28 is illustrated in FIG. 7. It is to be understood, however, that various other forms of bearings may be utilized to reduce rotational friction between the rotating disc and relatively stationary central support structure and cockpit.

The upper cover surface 30 includes a circular set of compression blades 35. The blades 35 are inclined toward the direction of rotation for the purpose of receiving and directing air forceably downward into the vicinity of the thrust means 14. The compressor blades 35 may be formed integrally with the cover surface 30 or may be separate elements that are securely fixed to the cover for rotation therewith. As shown in FIG. 1, the compressor blades are substantially radial with respect to the axis for the disc and are situated directly adjacent to the cockpit 13. This places them radially inward of the first and second circular sets of turbine blades 25 and 26. Air may be received from the compressor blades 35 and directed outwardly through the turbine blades 25 and 26.

The thrust means 14 includes a number of thrust producing engines 38 (FIGS. 4 and 5) that are situated angularly about the axis of the disc. The engines 38 are illustrated in FIGS. 3 through 5. They are substantially radial and are situated radially between the circular set of compressor blades 35 and the sets of turbine blades 25 and 26. They may therefore utilize air received from the compressor blades as combustion air, directing that air forceably outward through thrust ports 43 and against one or both sets of turbine blades.

A means 39 (FIG. 5) is provided for angularly adjusting the thrust produced by the thrust means 14. Means 39 may be utilized to direct thrust produced by the thrust means 14 upwardly over the first set of turbine blades or downwardly over the second set or horizontally over both sets. Means 39 include pivot mounts 40 that pivotally carry the thrust producing engines for selective pivotal movement about horizontal axes. FIG. 5 shows one of the pivot mounts 40 mounting two engines 38 in tandem to the central support structure 12. A jack means 41 is provided interconnecting the central support structure and pivot means for pivoting the engines about the axis of the pivot mount 40.

The radial thrust producing engines 38 comprise the thrust means 14 that are utilized for producing lift and for operating against the turbine blades 25 and 26 to rotate the discoidal wing 11. The means 39 for adjusting the angular direction of the thrust controls the amount of lift produced. If the thrusting engines are inclined downwardly such that their thrust is directed solely through the lower or second set of turbine blades 26, upward lift will be maximized. This position will be used for vertical takeoff and for hovering. The opposite position of the engines wherein the thrust is directed upwardly solely through the first set of turbine blades produces a downward force to cause rapid elevational descent of the disc. The position shown in FIG. 3 wherein the engines are substantially horizontal and the thrust is divided evenly over both surfaces of the discoidal wing produces a normal lift that may be utilized for maintaining the disc at a selected altitude while moving horizontally. Of course, an infinite variation between the angular positions described is possible through proper control of the jack means 41.

It is understood that will be a tendency due to the rotation of the discoidal wing 11 for the central support structure and cockpit to also rotate. To counteract this and to selectively rotate the cockpit, I provide a thrust diverting, stabilizing means 45. Means 45 is utilized for angularly deflecting the thrust produced by the thrust producing engines 38 to transmit some of the energy of the thrust into a corresponding amount of rotation of the central support structure and cockpit.

Means 45 basically includes a plurality of radial upright rudders 46, one for each pair of engines 38. The rudders 46 are pivoted at 47 (FIG. 4) to the central support structure 12 about upright pivot axes (parallel to the central upright axis). Each rudder 46 is located radially outward and adjacent to a thrust port 43 of an adjacent thrust producing engine 38. A jack means 48 is provided for each rudder 46 and is operative to pivot the rudder 46 about its upright pivot 47. The jack means 48 may be utilized to pivot the rudders 46 slightly into the thrust of the adjacent engines in order to cause a very slight torsion about the central axis to offset the torsion in the opposite direction produced through the rotating discoidal wing 11 and friction through the ring bearings 31, 33. In addition, the rudders may be pivoted further into the thrust produced by the engines to cause corresponding rotation of the cockpit and central support structures. This changes the direction of movement for the disc. This is so because the horizontal directional thrust means 15 is also connected to the central support structure and will rotate therewith.

The horizontal directional thrust means 15 is comprised of thrust producing engines 55. There are a pair of the engines 55 mounted to diametrically opposed angular engine mounting struts 56. The struts extend angularly downward from the central support structure and cockpit to mount the engines 55 equidistant from the central rotational axis and elevationally below the outward trailing edge 19.

The engines 55 shown in FIGS. 2, 3 and 8 are parallel and operate in unison to cause motion of the disc in a straight path determined by the direction of thrust. However, means is provided at 57 for varying the positions of the engines to correspondingly vary the direction of thrust produced thereby. Such means 57 may be utilized to completely rotate the engines 180° simultaneously and in opposite directions so that forward motion of the disc may be slowed, brought to a stop, and reversed. Likewise, the engines may be pivoted 90° from the position shown in FIG. 8 to the dashed line positions. In these positions the engines 55 assist in producing lift. Horizontal directional force components are cancelled by the opposed engines 55, but since thrust from both is directed downwardly, an upward resultant is produced that increases the upward lift produced through the internal engines 38.

It is understood that the thrust producing engines 55 may be of the variety including thrust reversing mechanisms whereby full 180° rotation of the engines is not required. However, provision of the engine position varying means 57 will still be beneficial to assist in lift during takeoff and hovering. Means 57 may, if necessary, perform some of the steering functions and augment the stabilizing function of the thrust deflecting means 45. Control of each engine independently in a steering mode, where the engines would pivot independently, in response to a steering control could augment or in emergency, replace the steering capability of stabilizing, diverting means 45.

Means 57 is illustrated in FIG. 6 where a drive mechanism 58 is shown attached to a thrust producing engine 55. Mechanisms 58 impart rotation to the engines 55 about axes that converge with the axis of rotation for the discoidal wing. The mechanisms 58 may be appropriate forms of motors connected to the associated engine through a pivot 59. The axes of the pivots are perpendicular to the angles of inclination for the engine mounting struts 56. The engines 55 may thus be freely rotated about the axis of the pivots 59 in arcs of 180°. Appropriate control (not shown) may be provided as indicated above to pivot the engines in unison in opposite directions or independently, depending on the mode of operation.

FIGS. 3 and 4 best illustrate the cockpit structure 13 and adjacent portions of the central support structure 12. The cockpit may include a spherical transparent bubble 61 protruding upwardly above the compressor blades 35. The clear bubble 61 allows a full field of vision for a pilot who may sit within the cockpit at a seat and control console 62. It is noted that the illustrated example of my invention shows a seat and control console 62 for carrying a single rider. It is envisioned, however, that the scale of the disc may be varied according to the use and load requirement.

Below the seat and control console 62 is a lower cockpit housing 63. This area may include various provisions for fuel, fuel supplying, controls, etc., which are known in the aeronautical and related industries.

A set of landing gear 65 is provided at a bottom side of the lower cockpit housing 63. The landing gear includes at least three wheels 66 mounted to vertically extensible jacks 67 for extension and retraction of the wheels relative to the cockpit housing 63. The jacks are operable to lower the wheels and are retractable into a recess formed within the lower cockpit housing 63.

From the above technical description, operation of the invention may now be understood.

Flight is initiated by starting and controlling the thrust of the thrust means 14 to include a downward thrust component. This is done by operating the means 39 to adjust the thrust angle of the engines 38 downwardly through the lower, second set of turbine blades 26 and toward the ground surface. An upward force is thereby produced and since the engines 38 are diametrically opposed in relation to the axis of the disc, the upward lift is produced along a vertical line. The thrust produced also acts against the second set of turbine blades 26 to initiate rotation of the discoidal wing. As the engine thrust lifts the disc upwardly, the discoidal wing will come to full rotating speed.

If additional upward thrust is required, the engines 55 may be pivoted to the opposed thrusting positions (dashed lines in FIG. 8) so their thrust will add to the upward lift component produced through the engines 38. As sufficient altitude is gained, the engines 55 may be pivoted about the axes of their pivots 59 to produce a horizontally directed thrust. This thrust will serve to move the flying disc in a horizontal direction while the remaining engines 38 may be operated at lower power to merely maintain the altitude of the disc. This is so because the air foil shape of the disc as it moves horizontally also serves to produce a certain amount of lift, thereby reducing the demands upon the engines 38. Of course, the air pressure above the convex surface 21 is reduced while the discoidal wing is rotating due to action of the compressor blades 35. They serve to draw air downwardly from above the discoidal wing and into the confines of the central support structure. This air is used for combustion air for engines 38 and is directed outwardly through the turbine blades 25 and 26 to produce lift and rotation.

Directional change is made simply by controlling the thrust diverting and stabilizing means 45. The radial upright rudders 46 are pivoted by the jack means 48 selectively to react against the thrust produced by engines 38 and cause pivotal movement of the cockpit and central support structure about the central axis of the disc. This causes corresponding pivotal movement of the horizontal thrust producing engines 55, and, as a result, direction of the disc movement is abruptly changed. Turns may be performed without banking of the disc, although such tilting may be preferred and can be initiated by varying the angular relationships of the horizontal thrust producing engines.

Altitude may be varied somewhat by simultaneously pivoting the horizontal thrust producing engines in opposite directions about their inclined axes. Primary altitudinal changes, however, are made by pivoting the engines 38 up or downwardly relative to the concave and convex surfaces of the discoidal wing.

Slowing or stopping midflight may be accomplished by either reversing direction of the horizontal thrust producing engines to cause a halt to forward movement of the disc or providing the engines 55 with thrust reversing mechanisms by which the forward velocity of the disc is slowed to a stop. Appropriate controls may then be operated to increase the thrust component in a downward direction through the engines 38 and, if required, the engines 55 may be pivoted to the dashed line position (FIG. 8) to assist in producing vertical lift. Such hovering may be utilized during slow vertical descent of the disc toward a landing surface to accomplish takeoff or midflight at relatively any selected altitude.

Should the disc lose power because of mechanism failure or lack of fuel, the discoidal wing will continue rotating about its axis on the bearings and the disc can be safely landed in an upright position at a distant location through the free flight advantage produced by the spinning discoidal wing. Enough thrust may be produced solely by the compressor blades 35 over the turbine blades 25 and 26 to continue rotation of the discoidal wing during descent. This may allow also for some manual control of the thrust diverting and stabilizing devices 45 to prevent undesirable rotation of the central support structure and cockpit area.

It is to be understood that the above description and attached drawings are given by way of example merely to set forth a preferred form of my invention. The following claims set forth the scope of my invention.

What I claim is:

1. A flying disc, comprising:
a central support structure including an upright axis;
a discoidal wing having a convex upper surface and a concave lower surface centered about the upright axis;
bearings mounting the wing and support structure to one another for free independent rotation about the upright axis;
a first circular set of turbine blades centered on the upright axis and mounted on the wing to project upwardly on the convex upper surface thereof;
a second circular set of turbine blades centered on the upright axis and mounted on the wing to project downwardly on the concave lower surface thereof;
said turbine blades of both sets being arranged to impart rotational motion of said discoidal wing about the upright axis in response to fluid thrust directed against them from within the central support structure;

thrust means within the support structure for producing an outwardly directed thrust against the turbine blades;

means for angularly adjusting the thrust produced by the thrust means so it may be directed upwardly against the first set of turbine blades or downwardly against the second set of turbine blades, or horizontally against both sets of turbine blades equally;

thrust diverting means mounted on the central support structure and positioned between the thrust means and turbine blades for angularly deflecting thrust to cause a resultant rotation or stabilization of rotation of the central support structure relative to said discoidal wing; and horizontal directional thrust means mounted on the central support structure for producing directional thrust to move the disc horizontally during flight.

2. The flying disc as defined by claim 1, further comprising:

a circular set of compressor blades centered on the upright axis and mounted on said discoidal wing along the convex surface thereof;

said compressor blades being arranged substantially radially with respect to the upright axis and spaced above and radially inward of said turbine blades; and wherein said thrust means is comprised of a plurality of thrust producing engines equally spaced about the upright axis with thrust ports directed radially outward from the upright axis and with intake ports situated adjacent to said compressor blades.

3. The flying disc as defined by claim 1 wherein the horizontal directional thrust means is comprised of at least one horizontal thrust producing engine mounted to the central support structure below the concave surface of said wing.

4. The flying disc as defined by claim 3 further comprising means for pivoting the horizontal thrust producing engine about an axis that is inclined relative to the upright axis.

5. The flying disc as defined by claim 1 further comprising annular flotation means along the circular periphery of said discoidal wing.

6. The flying disc as defined by claim 1 wherein the thrust diverting means for angularly adjusting the thrust produced by the thrust means is comprised of:

a plurality of normally radial upright rudders pivoted to the central support structure about upright axes between the thrust means and sets of turbine blades; and means for selectively pivoting said rudders about their axes from their normally radial positions.

7. The flying disc as defined by claim 1 further comprising a domed cockpit centered on the upright axis and mounted to the central support structure, projecting upwardly above the convex surface.

8. The flying disc as defined by claim 1 wherein said thrust means is comprised of a plurality of thrust producing engines that are equally spaced about the upright axis with thrust ports directed radially outward from the upright axis;

and wherein said horizontal directional thrust means is comprised of at least one thrust producing engine mounted to the central support structure below the concave surface.

9. The flying disc as defined by claim 1 wherein said bearing includes a pair of ring bearings mounted between the central support structure and discoidal wing with one ring bearing of the pair being centered on the upright axis and operatively mounted between the upper convex surface and the central support structure and with the remaining ring bearing being centered on the upright axis and operatively mounted between the lower concave surface and the central support structure.

10. The flying disc as defined by claim 1 further comprising means for selectively varying the directional thrust produced by the horizontal directional thrust means.

11. The flying disc as defined by claim 10 wherein the horizontal directional thrust means is comprised of a pair of thrust producing engines mounted by substantially radial engine struts to the central support structure, the engines being spaced on opposite sides of the upright axis and at equal distances therefrom.

12. The flying disc as defined by claim 11 wherein the means for varying the directional thrust produced by the horizontal directional thrust means includes pivot mechanisms mounting the thrust producing engines to the engine struts for selective pivotal movement thereon about axes spaced outwardly of the upright axis.

13. The flying disc as defined by claim 12 wherein the engine pivot axes are inclined at equal angles in regard to the upright axis.

14. A flying disc, comprising:

a central support structure including an upright axis;

a cockpit centered within the central support structure on the upright axis;

a discoidal wing having a convex upper surface and a concave lower surface;

the upper and lower surfaces being joined at a circular leading edge and a concentric outward trailing edge, both edges being centered on the upright axis;

bearing means mounting the discoidal wing to the central support structure for free rotation about the upright axis;

a first circular set of turbine blades centered on the upright axis and mounted to the discoidal wing along the upper convex surface adjacent the circular leading edge;

a second circular set of turbine blades centered on the upright axis and mounted to the discoidal wing along the lower concave surface adjacent the circular leading edge;

the first and second sets of turbine blades being positioned on the discoidal wing to impart rotation to the discoidal wing about the upright axis in response to fluid thrust directed against them from within the central support structure;

thrust means within the central support structures for producing an outwardly directed thrust against the sets of turbine blades;

means for angularly adjusting the thrust produced by the thrust means so it may be selectively directed against the first set of turbine blades or against the second set of turbine blades or against both sets of turbine blades;

means for selectively stabilizing the central support structure and cockpit against rotation about the upright axis; and horizontal directional thrust means mounted on the central support structure for producing directional thrust for moving the disc horizontally during flight.

15. The flying disc as defined by claim 14 wherein the concentric trailing edge is spaced elevationally below the circular leading edge and the second circular set of turbine blades.

16. The flying disc as defined by claim 14 wherein the thrust means is situated radially between the cockpit and leading edge and further comprising:

an upper cover surface extending inwardly from the first set of turbine blades toward the cockpit.

17. The flying disc as defined by claim 16 further comprising a set of compressor blades on the upper cover surface radially inward of the sets of turbine blades, for receiving and directing air downwardly to the thrust means and sets of turbine blades.

18. The flying disc as defined by claim 16 further comprising a bottom cover surface extending inwardly from the second set of turbine blades toward the cockpit.

19. The flying disc as defined by claim 16 wherein the bearing means is comprised of a ring bearing rotatably mounting the upper cover surface to the cockpit and central support structure.

20. The flying disc as defined by claim 14 wherein the means for selectively stabilizing the central support structure and cockpit is comprised of a plurality of normally radial upright rudders pivoted to the central support structure about upright axes between the thrust means and sets of turbine blades; and means for selectively pivoting the rudders about their axes from their normally radial positions.

21. The flying disc as defined by claim 14 wherein the horizontal directional thrust means is comprised of at least one thrust producing engine mounted to the central support structure below the trailing edge of the discoidal wing.

22. The flying disc as defined by claim 21 further comprising means for pivoting the engine about an axis relative to the cockpit that is inclined with respect to the upright axis.

23. The flying disc as defined by claim 14 wherein said thrust means is comprised of a plurality of thrust producing engines that are equally spaced about the upright axis with thrust ports directed radially outward from the upright axis; and wherein said horizontal directional thrust means is comprised of at least one thrust producing engine mounted to the central support structure below the concave surface.

24. The flying disc as defined by claim 14 wherein the thrust means is comprised of a plurality of thrust producing engines spaced equiangularly about the upright axis and the means for angularly adjusting the thrust produced by the thrust means is comprised of pivot mounts for the engines enabling pivotal movement of the engines about horizontal axes and jack means between the engines and the central support structure for selectively pivoting the engines about the horizontal axes.

* * * * *